O. E. BENSON.
COMBINATION VEHICLE LIFT AND STAND.
APPLICATION FILED APR. 24, 1917.
1,253,127.
Patented Jan. 8, 1918.
2 SHEETS—SHEET 1.
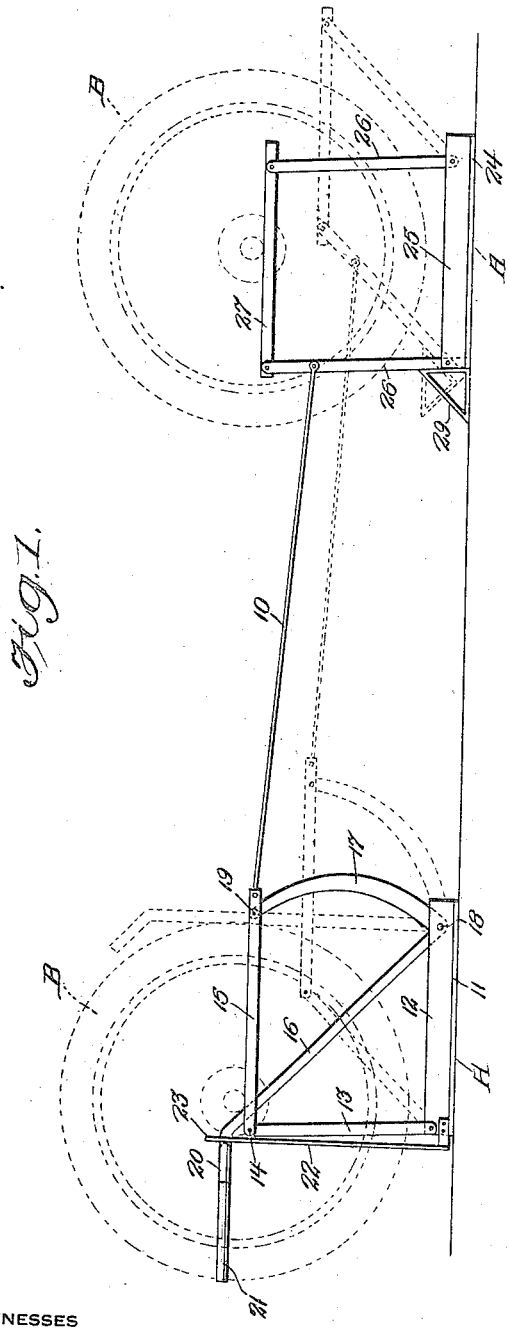
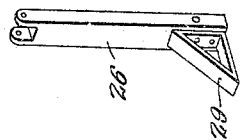
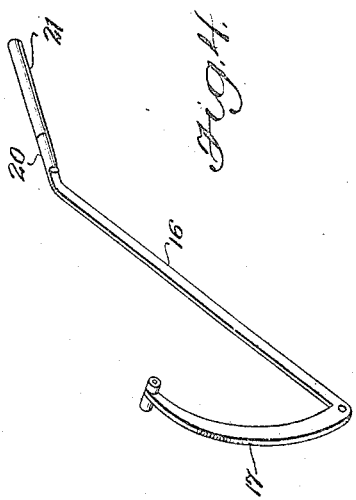
WITNESSES
J. H. Crawford
Edward Yeager
INVENTOR
O. E. Benson,
BY Victor J. Evans
ATTORNEY O. E. BENSON.
COMBINATION VEHICLE LIFT AND STAND.
APPLICATION FILED APR. 24, 1917.
1,253,127.
Patented Jan. 8, 1918.
2 SHEETS—SHEET 2.
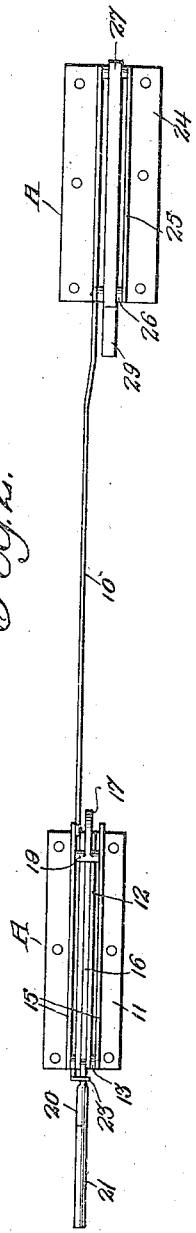
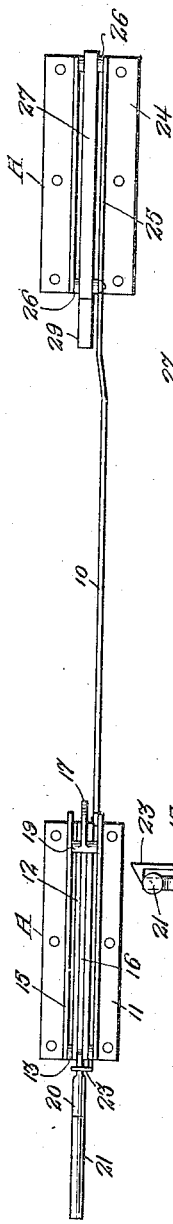
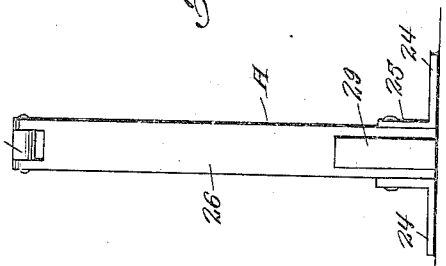
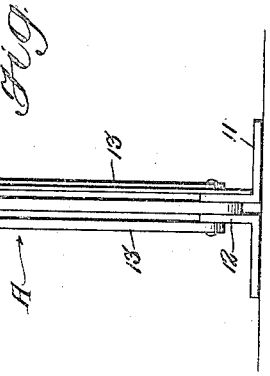
WITNESSES
INVENTOR
O. E. Benson,
BY Victor J. Evans
ATTORNEY

UNITED STATES PATENT OFFICE.

OTTO E. BENSON, OF WHITE CLOUD, KANSAS.

COMBINATION VEHICLE LIFT AND STAND.

1,253,127.

Specification of Letters Patent.

Patented Jan. 8, 1918.

Application filed April 24, 1917. Serial No. 164,183.

*To all whom it may concern:*

Be it known that I, OTTO E. BENSON, a citizen of the United States, residing at White Cloud, in the county of Doniphan and State of Kansas, have invented new and useful Improvements in Combination Vehicle Lifts and Stands, of which the following is a specification.

This invention comprehends the provision of a combination lift and stand for vehicles, and is primarily intended for use with automobiles, although its use is not limited in this respect.

Generally stated, the invention aims to provide a vehicle actuated means over which the vehicle passes when use of the means is desired, the means being automatically actuated at a predetermined interval to lift and support the vehicle spaced from the ground or surface. The invention is particularly advantageous when it is desired to apply chains to or remove the same from the wheels of the vehicle, also for washing the vehicle, while use of the invention in a garage will result in a great saving in wear of tires, as the latter are relieved from the weight of the machine over night, or during long periods of time when use of the machine is not desired.

The nature and advantages of the invention will be better understood when the following detail description is read in connection with the accompanying drawings, the invention residing in the construction, combination and arrangement of parts as claimed.

In the drawings forming part of this specification like numerals of reference indicate similar parts in the several views and wherein:—

Figure 1 shows the invention in side elevation, with one pair of the supports collapsed in inactive position, and the other pair of supports in set-up position for use.

Fig. 2 is a top plan view.

Fig. 3 is an enlarged end elevation of one of the supports.

Fig. 4 is a detail view of the vehicle actuating element.

In carrying out my invention I make use of a plurality of supporting members indicated generally at A, and preferably four in number. The supporting members are adapted to support the front and rear axles of the vehicle B, so that the latter will be maintained in spaced relation to the ground or surface, when use of the invention is desired. Consequently the supporting members A are arranged in proper relation relatively, so that as the vehicle passes over the supports, the latter will be positioned beneath the axles of the vehicle and adjacent the walls thereof. The supports at each side of the vehicle are connected together through the instrumentality of the connecting rod 10, whereby the supports of each pair are actuated in unison, in a manner to be hereinabove more fully described.

The supports for the front axle of the vehicle, are identical in construction, each embodying a base consisting of a pair of spaced members of angle iron formation, the horizontally disposed flanges 11 of the respective members providing a relatively broad bearing surface, while the vertical flanges 12 support the frame-like structure constituting the support. Pivotally mounted upon the flanges 12 are spaced parallel standards 13 rising from the base and having their opposite extremities pivotally connected as at 14 with a pair of horizontally disposed parallel members 15 upon which the front axle of the vehicle is adapted to rest. Passing between the members 15 is a vertically disposed lever 16 which also extends between the vertical flanges 12 of the base, and forming a continuation of said lever is a rearwardly and upwardly curved arm 17 which is fulcrumed between the flanges 12 as at 18, and also between the parallel members 15 as indicated at 19. Manifestly by reason of this construction, a collapsible frame-like structure is produced, the collapsed or normal condition of such supports being clearly illustrated in Fig. 1. The lever 16 projects an appreciable distance above the members 15 and is thus disposed in the path of movement of the front axle of the vehicle, when the latter moves in this direction, and when the lever 16 is engaged by the front axle and moved in a forward direction, the frame-like structure is caused to assume an upright or set-up position for use, as clearly shown in Fig. 1. The lever 16 terminates to provide an angularly disposed socket 20 in which a suitable handle 21 may be introduced for operating the support manually, as the occasion may require. Rising from one side of the base of the respective supports, is a latch element 22 having a hook-like extremity 23 adapted to engage the lever 16 at the limit of its movement in a forward direction, with a view of holding the component parts of the collapsible frame-like structure rigid in set-up position for use.

The supports for the rear axle of the vehicle are also identical in construction, each support embodying a base consisting of spaced members of angle iron formation, the horizontally disposed flanges 24 of which being adapted to rest upon the ground or surface, while the vertical flanges 25 are disposed in spaced relation. Pivotally mounted upon the flanges 25 of the respective base members are spaced vertical standards 26 which have their upper extremities pivotally connected with a horizontally disposed member 27, which with the standards 26 define a substantially rectangular collapsible frame. As hereinabove stated, the supports for the front and rear axles are connected in pairs at each side of the machine, through the instrumentality of the connecting rod 10, and obviously when the lever 16 is actuated, the collapsible frame-like structures of the respective supports are moved simultaneously. If desired a bumper 29 of any suitable construction may be secured to the foremost standard 26 of the rear axle supports as shown.

In practice, when use of the invention is desired, the supports are positioned upon the ground in advance of the machine, and positioned relatively so that when the machine is driven over the supports, they will occupy positions immediately beneath the front and rear axles of the machine when the latter is stopped. The supports are normally collapsed in the manner shown in Fig. 1, with the lever 16 in an obstructing position for the front axle of the vehicle to engage and manipulate the lever at a predetermined time. As the front axle of the vehicle is brought into engagement with the lever 16, the latter is moved forwardly upon its pivot 18, with a result of moving the collapsible frame-like structures to an upright or active position, during which time the vehicle is lifted from the ground or surface. The latch element 22 automatically engages the lever 16 to assist in rigidly supporting the frame-like structures of the support in an upright or active position. With the use of the invention, the vehicle can be quickly and easily elevated and supported in spaced relation to the ground or surface, to relieve the tires of the weight of the machine when the latter is not in use, with a consequent saving in wear of the tires, while the invention is particularly advantageous for use for applying or removing anti-skid chains from the wheels of the vehicle, and for numerous other purposes.

While it is believed that from the foregoing description the nature and advantages of the invention will be readily apparent, I desire to have it understood that what is herein shown and described is merely illustrative of the preferred embodiment of the invention, to which I do not limit myself, and that such changes in the construction, combination and arrangement of parts may be resorted to when desired as fall within the scope of what is claimed.

What is claimed is:—

1. A combined vehicle lift and stand embodying a plurality of normally collapsed frames above which said vehicle is adapted to move, said frames being connected in pairs for simultaneous movement, a lever operatively associated with one frame of each pair and adapted to be actuated by the vehicle to move both of said frames to an active or set up position, said lever having an offset extremity whereby said lever may be manually actuated to collapse said frames, and means coöperating with said offset extremity to hold said frames rigid in set up position.

2. A combined vehicle lift and stand embodying a plurality of normally collapsed frames above which the vehicle is adapted to move, said frames being connected in pairs for simultaneous movement, a vehicle actuated lever operatively associated with one frame of each pair, and operable to move both of said frames to an active or set up position, said lever having an offset extremity to provide for the manual manipulation of said lever to collapse said frame, and a resilient hook like element disposed to automatically engage said extremity, whereby said frames are rigidly maintained in set up position.

In testimony whereof I affix my signature.

OTTO E. BENSON.

Copies of this patent may be obtained for five cents each, by addressing the "Commissioner of Patents, Washington D. C."